(12) United States Patent
Vadde (10) Patent No.: US 7,126,998 B2
(45) Date of Patent: Oct. 24, 2006

(54) ENVELOPE STABILIZATION METHOD AND APPARATUS

(75) Inventor: Venkatesh Vadde, San Jose, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 11/221,511

(22) Filed: Sep. 8, 2005

(65) Prior Publication Data

US 2006/0067414 A1    Mar. 30, 2006

Related U.S. Application Data

(60) Division of application No. 09/808,564, filed on Mar. 14, 2001, now Pat. No. 7,003,025, which is a continuation-in-part of application No. 09/704,086, filed on Nov. 1, 2000, now Pat. No. 6,999,503.

(60) Provisional application No. 60/229,571, filed on Aug. 31, 2000.

(51) Int. Cl.
*H04K 1/10* (2006.01)

(52) U.S. Cl. ................. 375/260; 375/295; 370/208

(58) Field of Classification Search ............... 375/219, 375/222, 260, 295, 377; 370/208, 210
See application file for complete search history.

(56) References Cited

U.S. PATENT DOCUMENTS

| | | | |
|---|---|---|---|
| 5,128,964 A | 7/1992 | Mallory | |
| 5,675,611 A | 10/1997 | Lehtinen et al. | |
| 5,694,433 A | 12/1997 | Dent | |
| 5,943,372 A | 8/1999 | Gans et al. | |
| 6,157,593 A | 12/2000 | Costa et al. | |
| 6,343,217 B1 | 1/2002 | Borland | |
| 6,973,141 B1 * | 12/2005 | Isaksen et al. | 375/308 |
| 2001/0050926 A1 * | 12/2001 | Kumar | 370/529 |
| 2002/0138807 A1 * | 9/2002 | Nguyen | 714/792 |
| 2004/0083254 A1 * | 4/2004 | Schenk | 708/607 |
| 2004/0152418 A1 * | 8/2004 | Sinha et al. | 455/42 |

* cited by examiner

*Primary Examiner*—Young T. Tse
(74) *Attorney, Agent, or Firm*—Slater & Matsil, L.L.P.

(57) ABSTRACT

A system and method is proposed to significantly reduce the peak to average power ratio (PAPR) for an OFDM system by stabilizing the signal envelope. By using partial response (PR) signaling to spread each sub-symbol over multiple subcarriers, the signal is first compress in time. The signal is then rearranged such that it is possible to stabilize the envelope at some constant value α, thus improving the PAPR without using excessive time-bandwidth resources.

25 Claims, 4 Drawing Sheets

| QPSK-Modulation, Number of Sub-carriers = 64, Input PAPR = 12.25-13.0 dB | | | |
|---|---|---|---|
| Linear Feedback | | Quadratic Feedback | |
| P$_{Added}$ (dB) | PAPR(dB) | P$_{Added}$ (dB) | PAPR (dB) |
| 3 | 9.4 | 1 | 9.6 |
| 4 | 8.2 | 2 | 8.5 |
| 5 | 6.9 | 3 | 7.4 |
| 6 | 6.1 | 4 | 6.3 |

Fig. 5

ENVELOPE STABILIZATION METHOD AND APPARATUS

CROSS-REFERENCE TO RELATED APPLICATIONS

This application is a divisional of patent application Ser. No. 09/808,564, entitled "Envelope Stabilization Method and Apparatus," filed on Mar. 14, 2001, now U.S. Pat. No. 7,003,025, which is a continuation-in-part to U.S. patent application Ser. No. 09/704,086, filed on Nov. 1, 2000, now U.S. Pat. No. 6,999,503, entitled "Partial Response Signaling for Orthogonal Frequency Division Multiplexing" claiming the benefit of U.S. Provisional Application No. 60/229,571, filed Aug. 31, 2000. All of the above-referenced applications are assigned to assignee of the present application and all are herein incorporated by reference.

BACKGROUND OF THE INVENTION

The present invention relates generally to communication systems. More particularly, the present invention relates to the stabilization of a signal envelope for communication systems.

Typical communication systems transmit information from one location or source to a second location or destination. The information travels from the source to the destination through a channel; this channel is typically a noisy channel. Thus, the channel introduces various forms of noise. The term "noise" is used herein to define various forms of signal corruption, such as interference, faxing, attenuation, environmental impact, and electronic noise, that alter the characteristics of a signal as it travels through a channel. Accordingly, the signal that is transmitted through the channel and received at a receiver may be a combination of the transmitted signal and the effects of noise introduced by the channel as a result of travelling through the channel.

In a cellular communications system, one type of noise is called "interference". More specifically, there may be at least two forms of interference in communication systems: co-channel interference (CCI) and inter-symbol interference (ISI). CCI arises in communication systems due in part to the fact that there are several transmitters in communication with the same receiving unit. The signal from one transmitter may interfere with the signal from another transmitter. Each transmitter may be an omni-directional transmitter. However, a signal being transmitted from one transmitter may take several paths as the signal travels from the transmitter to the receiver. This leads to ISI, which is a form of self-interference. In a cellular communication system, there are several mobile stations in communication with the same base station which often leads to CCI.

As indicated above, in a communication system, information is transmitted through the channel from the source to the destination. The information may be carried by a carrier signal that is modulated to contain or carry the information. Various forms of modulation may be used for transmission of the information through the channel. Modulation is the process of varying the characteristic of a carrier according to an established standard or scheme; the carrier is prepared or "modulated" by the information to produce a "modulated" carrier signal that is transmitted by the source to the destination through the channel. For example, in a cellular communication system, modulation is the process of varying the characteristics of the electrical carrier as information is being transmitted. The most common types of modulation are Frequency Modulation (FM), Amplitude Modulation (AM), and Phase Modulation (PM).

One modulation technique currently used in the industry is called Orthogonal Frequency Division Multiplexing (OFDM). OFDM is one of the techniques for multi-carrier modulation. Multi-carrier modulation is a technique for modulating multiple carriers with different information, all of which may be transmitted simultaneously or parallel in time. OFDM has high spectral efficiency as well as tolerance to multipath fading. As indicated above, transmitters are omni-directional and transmit in all directions. Thus, a signal emerging from a transmitter, or the source, may travel multiple paths to reach the receiver, or the destination. Accordingly, multipath fading occurs on a carrier signal's intensity, which results in alteration of the information being carried.

The efficiency of a system utilizing OFDM stems from the simultaneous or parallel transmission of several subcarriers in time. While this lowers the bit-rate on each of the subcarriers, it provides an "N"-fold increase in aggregate bit-rate, wherein "N" is the number of subcarriers. Additionally, because the low bit-rate signals hardly suffer any ISI and the subcarriers are orthogonal, it is possible to demodulate the subcarriers independent of each other. A conventional OFDM system comprises a set of sub-symbols X[k] transmitted in time using an Inverse Fast Fourier Transform (IFFT). The time-domain baseband signal can be represented as:

$$x[n] = \frac{1}{\sqrt{N}} \sum_{k=0}^{N-1} X[k] \cdot \exp\left(\frac{j2\pi kn}{N}\right), n = 0, 1 \ldots N-1$$

Thus, the N-sample long transmitted OFDM symbol vector can be expressed as:

$$x_N = \text{IFFT}\{X_N\}$$

where, $x_N$ and $X_N$ are the time and frequency domain symbol vectors, respectively.

In a typical OFDM system, binary symbols or bit streams are encoded in the form of complex valued numbers. The complex valued numbers are drawn from an M-ary alphabet. The complex valued numbers are then used to modulate a set of orthogonal sub-carriers to generate a time-domain signal using an Inverse Discrete Fourier Transform (IDFT). The resulting baseband signal, which is usually complex valued, is quadrature modulated on a Radio Frequency (RF) carrier and transmitted through an air interface channel. The transmitted signal is corrupted by channel noise and dispersion before being received. At the receiver end, by estimating the channel, equalizing for it and detecting the transmitted complex-valued numbers, the data is decoded.

There are several problems associated with systems that utilize OFDM modulation techniques. For example, the channel is subject to fading due to multipath and path loss. Additionally, the channel may suffer from ISI which poses a problem at the receiver when data has to be detected. Furthermore, manufacturers of devices that transmit and receive data are always faced with the challenge of increasing the amount of and the rate at which information can be transmitted over a finite bandwidth while overcoming signal loss due to channel noise.

Embodiments of the present invention are related to the implementation of Orthogonal Frequency Division Multiplexed (OFDM) systems. One of the persistent drawbacks of OFDM is the high peak-to-average power ratio (PAPR)

encountered in OFDM systems. Coherent addition of the modulating sub-symbols can lead to an occasional peak in the signal that is several dB above average. A high PAPR usually implies that a very linear but inefficient power amplifier (PA) must be used for RF transmission. Furthermore, to make allowance for the high PAPR, we need to operate the power amplifier with several dbs of input power backoff; thus, limiting the average power of the output signal. Clipping is often the simplest solution proposed, but can lead to out-of-band distortion. Clipping also causes signal loss and often yields unacceptable bit error rates (BER). Other techniques considered have been block-coding and constellation translation. A high PAPR typically implies that the power amplifiers at the transmitter end and the amplifiers at the receiver end need to be of very high linearity, and preferably of high efficiency too. It is very common to trade-off high linearity for efficiency in OFDM type of applications so that often highly linear but inefficient amplifiers end up being utilized. An embodiment of the present invention enables the use of efficient amplifiers potentially by stabilizing the envelope of the RF carrier in an OFDM system. Alternatively, it enables the use of the traditional amplifiers with greater output power. Partial response signaling is employed to compress the signal in time. Then the power envelope is shaped or more specifically, squared.

It is in light of this background information related to high peak-to-average power ratio (PAPR) encountered in OFDM systems described above that the present invention has evolved.

SUMMARY OF THE INVENTION

The present invention, accordingly, advantageously provides a system and method to reduce the peak to average power ratio (PAPR) for an OFDM system by stabilizing the signal envelope. By using partial response (PR) signaling to spread each sub-symbol over multiple subcarriers, the signal is first compressed in time. The signal is then rearranged such that it is possible to stabilize the envelope, thus improving the PAPR without using excessive time-bandwidth resources. The compression provides extra time in which to stabilize the envelope.

An advantage of an embodiment of the present invention is to be able to use an inexpensive and efficient amplifier or to be able to use a traditional class A amplifier with greater average output power.

A more complete appreciation of the present invention and the scope thereof can be obtained from the accompanying drawings which are briefly summarized below, the following detailed description of the presently-preferred embodiment of the invention, and the appended claims.

DETAILED DESCRIPTION

A novel apparatus and method to enable the use of inexpensive relatively more efficient amplifiers (instead of less efficient and expensive class-A amplifiers) with an OFDM system is provided. The use of high-efficiency amplifiers requires that signals with very stable envelopes only be amplified. An embodiment of the present invention provides a system and method by which the envelope of an OFDM signal (which fluctuates a lot under normal circumstances) is stabilized with tolerable loss in system bandwidth. In other words, the system strives to balance the envelope's amplitude and keep it nominally close to a predetermined value.

The embodiments provided involve the use of partial response signaling. Partial response signaling has been described in co-pending U.S. patent application Ser. No. 09/704,086, filed on Nov. 1, 2000, entitled PARTIAL RESPONSE SIGNALING FOR ORTHOGONAL FREQUENCY DIVISION MULTIPLEXING. By choosing a suitable partial response polynomial, up to 50% of the signal in time can be rendered practically insignificant. That is to say, the signal across 50% of the OFDM symbol time-period can be closely approximated to zero with little loss of accuracy.

Figure 1:
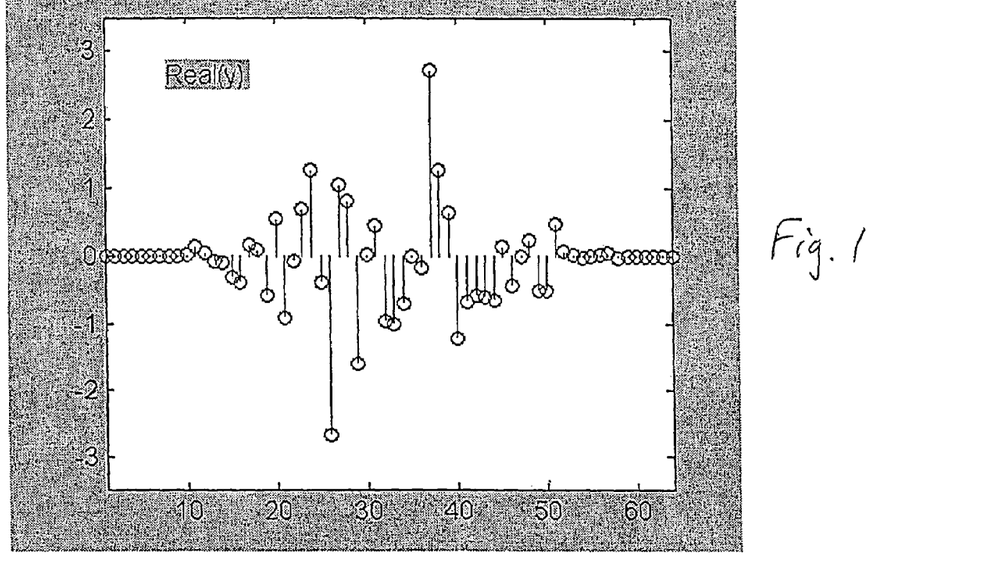
FIG. 1 is a graphical representation illustrating the real part of a partial response (PR) OFDM time-symbol with about 50% of the symbol duration carrying significant energy.
Figure 2:
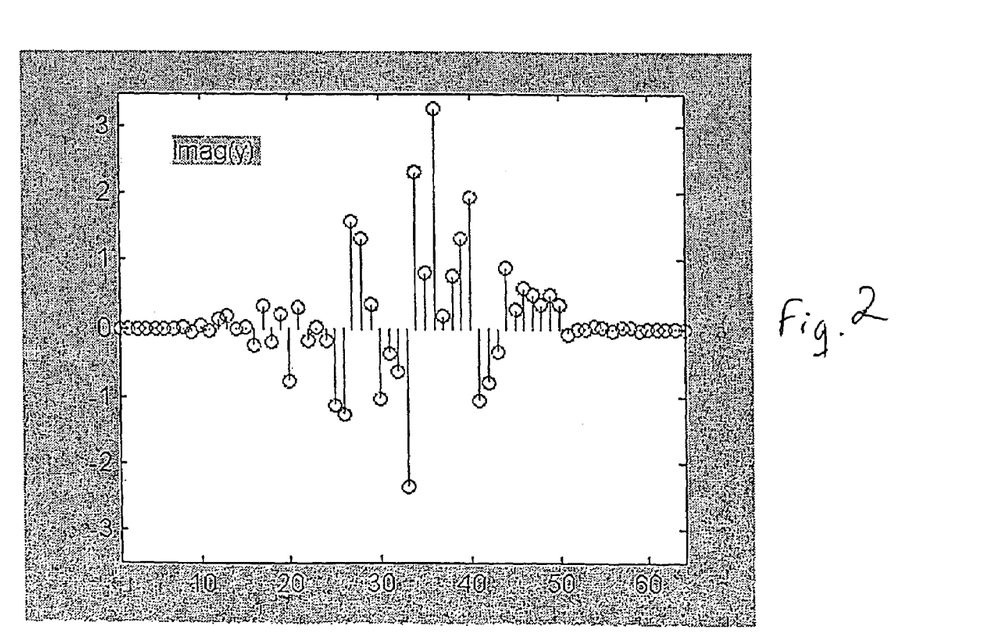
FIG. 2 is a graphical representation illustrating the imaginary part of a partial response (PR) OFDM time-symbol with about 50% of the symbol duration carrying significant energy.

FIGS. 1 & 2 illustrate the real and imaginary parts, respectively, of a partial response (PR) OFDM time-symbol with about 50% of the symbol duration carrying significant energy. It can be shown that using PR-signaling of lower orders (M=2,3 etc.), a relatively smaller fraction of the OFDM symbol may be suppressed. Embodiments of the present invention may be used with any order M, although the bandwidth traded off (for envelope stability) is higher at lower M.

Figure 3:
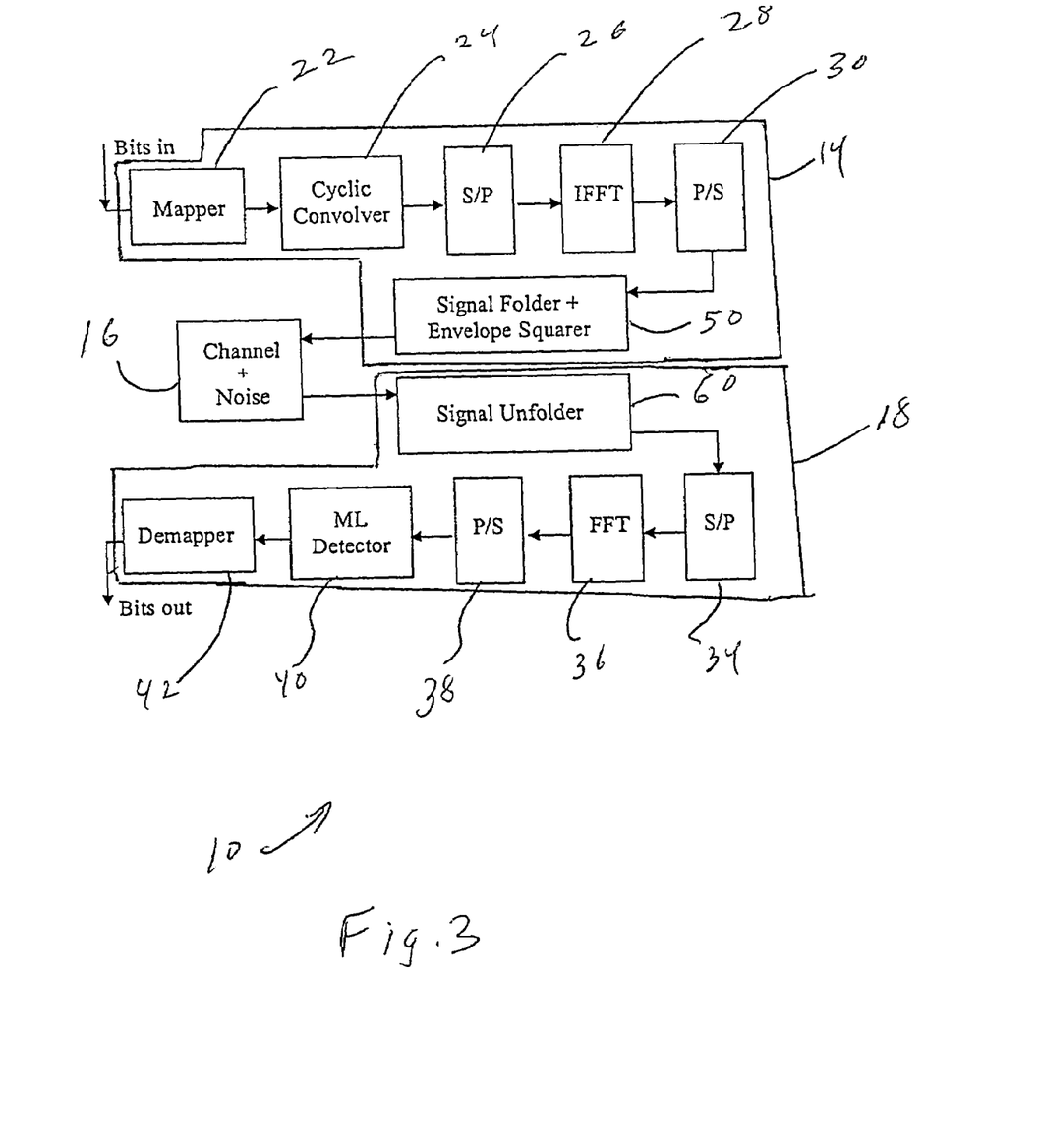
FIG. 3 is a block diagram illustrative of an envelope shaping/squaring system for a Partial Response Orthogonal Frequency Division Multiplexing (PR-OFDM) in accordance with an embodiment of the present invention.

Referring now to FIG. 3, communication system 10 in accordance with a preferred embodiment of the present invention is provided. System 10 may comprise transmitter 14, channel 16, and receiver 18, wherein system 10 may utilize a Partial Response (PR)-Orthogonal Frequency Division Multiplexing (OFDM) signal modulation technique. Transmitter 14 may comprise mapper 22, cyclic convolver 24, serial-to-parallel converter unit 26, Inverse Fast Fourier Transform (IFFT) unit 28, parallel-to-serial converter unit 30, and signal folder with envelope squarer 50. Transmitter 14 transmits the information to receiver 18 through channel 16. Channel 16 may be a noisy channel. Receiver 18 may comprise signal unfolder 60, serial-to-parallel converter unit 34, Fast Fourier Transform (FFT) unit 36, parallel-to-serial converter unit 38, Maximum Likelihood (ML) estimator unit 40, and demapper unit 42.

Information in the form of binary signals are received at transmitter 14 and inputted to mapper 22 for mapping to or encoding in the form of a set of complex numbers drawn from an M-ary alphabet to produce a complex signal, which is then used to modulate or prepare a carrier signal for transmission as discussed in detail below. Transmitter 14 transmits the carrier signal through channel 16 to receiver 18. As the carrier signal, which may be a time based signal, travels through channel 16, which may introduce noise to the carrier signal, such as x[n], corresponding to a channel impulse response, such as h[n], of channel 16. Cyclic convolver unit 24 performs a cyclic convolution on the complex signal. Additionally, cyclic convolver unit 24 may append a cyclic prefix (CP) at the leading edge or the beginning of the complex signal that also helps compensate for the effects of channel 16 and helps suppress Inter-Symbol Interference (ISI) in each of the low bit-rate sub-channels of the PR-OFDM signal.

The CP ensures that when channel 16 performs a convolution on each OFDM time-symbol the effect of channel 16 may be eliminated at receiver 18. In a partial response (PR) technique inter-subcarrier (i.e., inter-channel) interference (ICI) is generated and introduced in the frequency domain based signal so as to shorten the effective time-domain symbol. The generated ICI is introduced to the complex signal by cyclic convolver unit 24, as indicated above. Cyclic convolver unit 24 introduces, based on the desired or generated ICI, systematic or known amounts of dispersion to produce a partial response signal. In the system 10, the frequency symbol $X_N$ is subjected to a cyclic convolution by a known polynomial $c_N$ of order M, which is defined as follows:

$$c_N = [c(0) c(1) \ldots c(M-1) 0 0 \ldots 0]$$

The PR polynomial can be expressed as a zero-padded vector of length N with M non-zero terms. The resulting time-domain symbol vector can now be expressed as follows:

$$x_N = IFFT\{X_N c_N\}$$

where, denotes cyclic convolution performed by cyclic convolution unit 24, which disperses the information in each frequency-domain sub-symbol over M successive sub-carriers. Accordingly, receiver 18 requires a sequence-detection mechanism to unravel the input sub-symbols $X_N$, and this is performed by ML detector unit 40. Additionally, the other outcome of the cyclic convolution with $C_N$ is that the original time vector-symbol $x_N$ now bears an amplitude envelope given by the following:

$$e_N = IFFT\{c_N\}$$

By appropriately choosing the polynomial vector $C_N$, the transmitter 14 can effectively suppress energy in parts of the OFDM time symbol-vector, thereby producing a PR-OFDM symbol. For example, consider the set of polynomials obtained from the coefficients of powers of r in p(r), where:

$$p(r) = (1-r)^m; m=1,2, \ldots$$

The envelope vector resulting from such a polynomial has a null at each of its extremities. Consequently, the energy at the extremities or the tails of the OFDM time symbol-vector is effectively suppressed and can be dropped. Thus, cyclic convolver unit 24 generates a partial response signal with near zero energy at the extremities in the time domain.

The partial response signal, which is a frequency domain based signal, is then received by serial-to-parallel unit 26. Serial-to-parallel unit 26 converts the partial response signal from serial to parallel signaling and passes the parallel partial response signal to IFFT unit 28. IFFT unit 28 performs a modulation that is a transformation on the parallel partial response signal to generate real and imaginary components in the time domain. The transformed parallel partial response signal is derived from the partial response signal. The real and imaginary components of the transformed parallel partial response signal are received by the parallel-to-serial unit 30, which coverts to serial signaling to produce a transformed partial response (PR) signal that is ready for signal folding, envelope shaping or squaring and transmission.

The envelope amplitude at any instant is given by $|x_{Re}^2 + x_{Im}^2|$ where, $x_{Re}$ and $x_{Im}$ are the signal's in-phase and quadrature components. The compressed PR signal may now be rearranged in time. The signal is rearranged such that all the significant time-samples (in-phase and quadrature-phase samples) are placed on the in-phase carrier adjacent to one another. The quadrature-phase carrier may be used as a degree of freedom to shape or square the envelope of the modified signal. Squaring the envelope essentially means stabilizing it to a nominally constant value.

To proceed with signal folding and envelope shaping or squaring, the PR signal is received by signal folder and envelope squarer 50. Signal folder and envelope squarer 50 separates the real and imaginary parts of the significant section of the symbol and places the real and imaginary parts adjacent to one another.

At the end of signal folding process, the rearrangement may be represented by the time vector:.

$$x' = \{x_{Re}[0], \ldots, x_{Re}[N-d], x_{Im}[0], \ldots, x_{Im}[N-d]\}$$

The in-phase carrier (I) is modulated with signal samples x" derived from x'. The quadrature phase carrier (Q) is used as a degree-of-freedom to shape or "square" the envelope by placing suitably calculated samples on the quadrature-phase carrier. For every sample on the in-phase carrier, a corresponding sample is placed on the quadrature-phase carrier. This process balances the envelope amplitude and keeps it nominally close to a predetermined value so that amplitude may be maintained within the linear threshold of an amplifier, thus, avoiding any non-linear effects.

To illustrate various embodiments of the present invention, the envelope-stabilized signal may be represented as x" and the nominal envelope value may be denoted as $\alpha$. Two embodiments of the present invention: one using linear feedback and another using Quadratic feedback may be described by means of the following equations:

Linear Feedback Equations $$|x'| < \alpha \Rightarrow x''_{Im} = (\alpha - |x'|) \cdot sgn(x'); x''_{Re} = x' \qquad : \text{STEP-I}$$

$$|x'| > \alpha \Rightarrow x''_{Im} = -\frac{1}{2} x'; x''_{Re} = +\frac{1}{2} x' \qquad : \text{STEP-II}$$

Quadratic Feedback Equations $$|x'| < \alpha \Rightarrow x''_{Im} = \left(\sqrt{\alpha^2 - |x'|^2}\right) \cdot sgn(x'); x''_{Re} = x' \qquad : \text{STEP-I}$$

$$|x'| > \alpha \Rightarrow x''_{Im} = -\frac{1}{2} x'; x''_{Re} = +\frac{1}{2} x' \qquad : \text{STEP-II}$$

Since the samples on the quadrature-phase carrier are used as feedback terms, the equations describing their generation are referred to as "feedback equations".

In linear feedback embodiment, an attempt is made to keep the sum of the magnitudes of the in-phase and quadrature samples constant. In quadrature feedback embodiment, an attempt is made to keep the sum of the magnitude squares a constant. When the envelope has already been exceeded by the in-phase sample's magnitude (Step-II), the amplitude is halved. Notice that in one case (Step-I), the two samples $x''_{Re}$ and $x''_{Im}$ bear the same sign, while in another case (Step-II), the two samples $x''_{Re}$ and $x''_{Im}$ bear opposite signs.

This is a simple artifice that will later help us reconstruct the original signal x at the receiver from the received signal x".

At the receiver end, the signal is reconstructed utilizing the in-phase signal received, and the quadrature-phase signal received [x"$_{Re}$ and x"$_{Im}$]. The reconstruction essentially does the reverse of x'={x$_{Re}$[0], . . . , x$_{Re}$[N−d], x$_{Im}$[0], . . . , x$_{Im}$[N−d]} yielding a noise corrupted version of the (N−d) samples long PR signal x[n].

The signal is reconstructed utilizing the estimated magnitude of y (y_mag) which is the absolute value of(x"$_{Im}$+x"$_{Re}$). The idea behind this estimation is to infer whether Step-I or Step-II was used in constructing the signal x" from x'. If Step-1 was used, then the magnitude of y (y_mag) should ideally be close to α; else, if Step-II was used, the value of (y_mag) is ideally close to 0. Thus, the magnitude of Y (y_mag) becomes a tool to figure out whether we employed Step-I or Step-II in constructing the transmitted signal x".

The folded partial response signal is transmitted through the channel 16 and received at the receiver 18 as a transmitted folded partial response signal. The transmitted folded partial response signal is received and unfolded at signal unfolder 60. This may be implemented as an adder and a thresholding device.

Signal unfolder 60 extracts the original PR-OFDM signal from the envelope squared PR-OFDM signal. A systematic way to decipher the phase (i.e. sign) of x' from the transmitted signal values is provided. The quantity y_sign=sign (x"$_{Re}$+x"$_{Im}$,) or sign(x"$_{Re}$−x"$_{Im}$), depending on whether Step-I or Step-II was used, respectively, in constructing x". The way x" is devised from x', one can look at y_sign and reliably extract the sign of the in-phase component (which has the real and imaginary parts of the PR-OFDM symbol). Thus, using the quantities y_mag and y_sign, we can estimate the magnitude and phase of each of the real and imaginary components of the original PR-OFDM symbol.

If the absolute of (x"$_{Im}$+x"$_{Re}$) is greater than half the nominal envelope value (α/2) then STEP-I was used. Thus, x'=sign(x"$_{Re}$+x"$_{Im}$) times the absolute value of x"$_{Re}$.

If the absolute of x"$_{Im}$+x"$_{Re}$ is less than or equal to half the nominal envelope value (α/2) then STEP-II was used. Thus, x'=sign(x"$_{Re}$−x"$_{Im}$) times the absolute value of (x"$_{Re}$−x"$_{Im}$).

The unfolded signal undergoes zero-padding (to fill up to an N-long vector) and then passes to serial-to-parallel unit 34 and converted to a parallel transmitted partial response signal and passed to FFT unit 36. FFT unit 36 performs the inverse transformation of the transformation performed by IFFT unit 28 and, hence, transforms the signal from a time domain based signal to a frequency domain based signal to produce a converted parallel transmitted partial response signal. The converted parallel transmitted partial response signal is passed to the parallel-to-serial unit 38. Parallel-to-serial unit 38 changes the converted parallel transmitted partial response signal to a converted transmitted partial response signal. The converted transmitted partial response signal is passed to a maximum likelihood (ML) detector unit 40. ML unit 40 unravels the converted transmitted partial response signal to produce or recover the complex-number based signal. Demapper unit 42 converts the complex-number based signal into a binary stream that is outputted from the receiver.

As described above, the signal envelope is maintained at some constant value. In the preferred embodiment, this value is represented by α. The value of α is fixed at a few dB above the existing expected envelope power. The extra dBs added to the envelope is what is referred to as pad-power. It is an objective of an embodiment of the present invention to be able to use inexpensive and efficient amplifiers or use traditional amplifiers at greater output power.

The time-extent of PR signal has been doubled from (N−d) to 2(N−d). The fractional time-overhead can be quantified as 2(1−d/N). The real objective of using PR signaling is to reduce this time-overhead incurred when compared to not using PR signaling. Not using PR signaling essentially leads to a 100% time-overhead, which is a significant cost to pay. Since the PR signal helps omit d time-samples, it correspondingly reduces the time-overhead incurred for envelope squaring.

Figure 4:
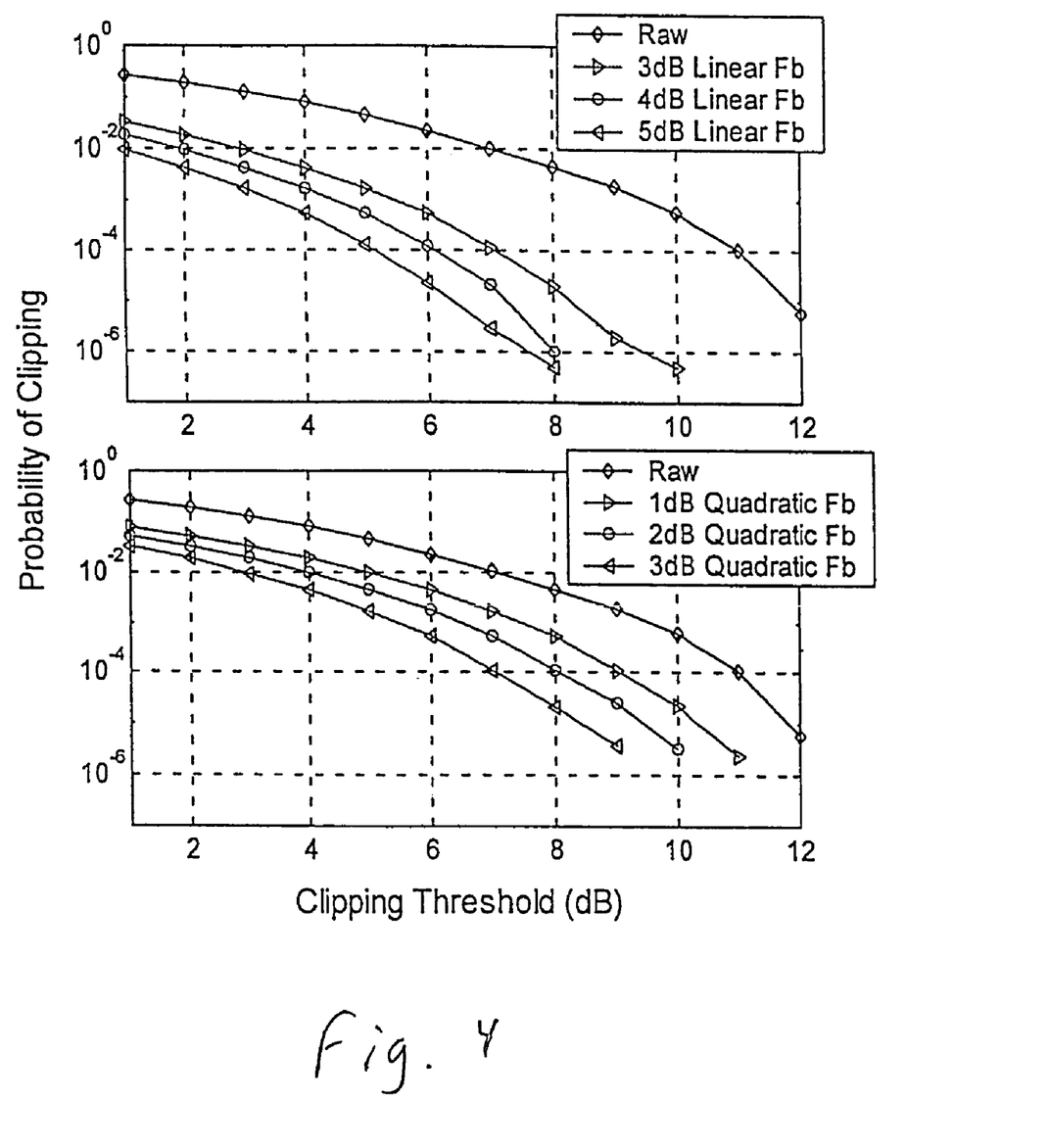
FIG. 4 is a graphical representation of the probability of clipping for different pad-powers using linear feedback and quadratic feedback.

FIG. 4 is a graph of the probability of clipping for different pad-powers using linear feedback and quadratic feedback. With linear feedback, we pad the envelope with 3–6 dB of extra power whereas with quadratic feedback we employ 1–4 dB pad-power (relative to the normal, average signal envelope). In both cases, the clipping probability substantially decreases after using envelope squaring. Clearly, quadratic feedback seems to offer comparable clipping probabilities at lower pad-powers than a linear feedback system. At least two orders of magnitude decrease in clipping probability can be observed at a clipping threshold of about 6 dB using both linear and quadratic feedback.

Figure 5:
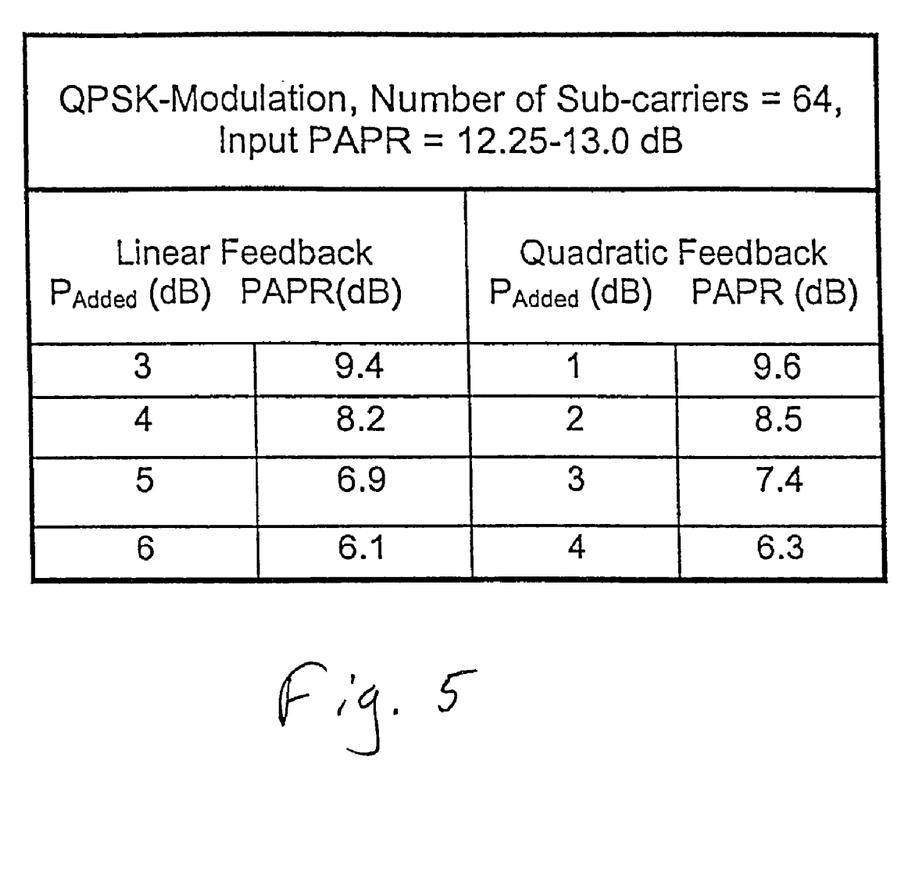
FIG. 5 is a table listing the PAPR before and after envelope shaping/squaring.

FIG. 5 lists the PAPR before and after envelope squaring. Simulations were performed for QPSK modulation with 64 subcarriers. The nominal PAPR for normal OFDM signals turned out to be 12–13 dB. The PAPR improvement ranged from 3–6 dB as we increased the pad-power from 1–4 dB for quadratic feedback, and from 3–6 dB for linear feedback. These are fairly high improvements in PAPR that cannot be obtained by normal techniques such as using transform signaling (example: Hadamard transform) or using companding as suggested by some others.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A transmitter for use with a communication system, comprising:
    an inverse fast Fourier transform unit configured to generate real and imaginary components of a signal in a time domain; and
    a signal folder and envelope squarer configured to generate a modulated signal by modulating an in-phase carrier with samples derived from a vector including said real and imaginary components of said signal, said signal folder and envelope squarer further configured to shape an envelope of said modulated signal by modulating a quadrature-phase carrier with selected samples corresponding to said samples of said modulated signal, thereby maintaining an amplitude of said modulated signal within a predetermined value.

2. The transmitter as recited in claim 1 wherein said signal folder and envelope squarer is further configured to separate said real components of said signal from said imaginary components of said signal.

3. The transmitter as recited in claim 1 wherein a sum of a magnitude of ones of said samples and corresponding ones of said selected samples are substantially constant.

4. The transmitter as recited in claim 1 wherein a sum of a square of a magnitude of ones of said samples and corresponding ones of said selected samples are substantially constant.

5. transmitter as recited in claim 1 wherein ones of said selected samples is a fraction of corresponding ones of said samples.

6. The transmitter as recited in claim 1 wherein ones of said samples and corresponding ones of said selected samples bear opposite signs.

7. A transmitter for use with a communication system employing a partial-response, orthogonal frequency division modulation technique, comprising:
   a cyclic convolver configured to generate a partial response signal from a complex signal;
   an inverse fast Fourier transform unit configured to generate real and imaginary components of said partial response signal in a time domain; and
   a signal folder and envelope squarer configured to generate a modulated signal by modulating an in-phase carrier with samples derived from a vector including said real and imaginary components of said partial response signal, said signal folder and envelope squarer further configured to shape an envelope of said modulated signal by modulating a quadrature-phase carrier with selected samples corresponding to said samples of said modulated signal, thereby maintaining an amplitude of said modulated signal within a predetermined value.

8. The transmitter as recited in claim 7 wherein said signal folder and envelope squarer is further configured to separate said real components of said partial response signal from said imaginary components of said partial response signal.

9. The transmitter as recited in claim 7 wherein a sum of a magnitude of ones of said samples and corresponding ones of said selected samples are substantially constant.

10. The transmitter as recited in claim 7 wherein a sum of a square of a magnitude of ones of said samples and corresponding ones of said selected samples are substantially constant.

11. The transmitter as recited in claim 7 wherein ones of said selected samples is a fraction of corresponding ones of said samples.

12. The transmitter as recited in claim 7 wherein ones of said samples and corresponding ones of said selected samples bear opposite signs.

13. A transmitter for use with a communication system employing a partial-response, orthogonal frequency division modulation technique, comprising:
   means for generating a partial response signal from a complex signal;
   means for generating real and imaginary components of said partial response signal in a time domain;
   means for generating a modulated signal by modulating an in-phase earner with samples derived from a vector including said real and imaginary components of said partial response signal; and
   means for shaping an envelope of said modulated signal by modulating a quadrature-phase carrier with selected samples corresponding to said samples of said modulated signal, thereby maintaining an amplitude of said modulated signal within a predetermined value.

14. The transmitter as recited in claim 13 further comprising means for separating said real components of said partial response signal from said imaginary components of said partial response signal.

15. The transmitter as recited in claim 13 wherein a sum of a magnitude of ones of said samples and corresponding ones of said selected samples are substantially constant.

16. The transmitter as recited in claim 13 wherein a sum of a square of a magnitude of ones of said samples and corresponding ones of said selected samples are substantially constant.

17. The transmitter as recited in claim 13 wherein ones of said selected samples is a fraction of corresponding ones of said samples.

18. The transmitter as recited in claim 13 wherein ones of said samples and corresponding ones of said selected samples bear opposite signs.

19. A communication system employing a partial-response, orthogonal frequency division modulation technique, comprising:
   a transmitter, including:
      a mapper that encodes information in a binary signal format into a complex signal having a set of complex numbers,
      a cyclic convolver that generates a partial response signal with near zero energy at extremities thereof from said complex signal,
      an inverse fast Fourier transform unit that generates real and imaginary components of said partial response signal in a time domain, and
      a signal folder and envelope squarer that separates said real components from said imaginary components of said partial response signal, said signal folder and envelope squarer further generates a modulated partial response signal by modulating an in-phase carrier with samples derived from a vector including said real and imaginary components of said partial response signal, said signal folder and envelope squarer still further shapes an envelope of said modulated partial response signal by modulating a quadrature-phase carrier with selected samples corresponding to said samples of said modulated partial response signal; and
   a receiver, including:
      a signal unfolder that extracts a partial response signal by estimating a magnitude and phase of real and imaginary components thereof from said modulated partial response signal.

20. The communication system as recited in claim 19 wherein:
   said transmitter, further includes:
      a serial-to-parallel converter unit that converts said partial response signal into a parallel format, and
      a parallel-to-serial converter unit that converts said real and imaginary components of said partial response signal into a serial format; and
   said receiver, further includes:
      a serial-to-parallel converter unit that converts said partial response signal into a parallel format,
      a fast Fourier transform unit that transforms said partial response signal into a frequency domain,
      a parallel-to-serial converter unit that converts said partial response signal into a serial format in said frequency domain,
      a maximum likelihood detector unit that recovers a complex signal having a set of complex numbers from said partial response signal, and a demapper unit that converts said complex numbers into a binary signal format.

21. The communication system as recited in claim 19 wherein said signal unfolder further pads said partial response signal with zeros.

22. The communication system as recited in claim 19 wherein a sum of a magnitude of ones of said samples and corresponding ones of said selected samples are substantially constant.

23. The communication system as recited in claim 19 wherein a sum of a square of a magnitude of ones of said samples and corresponding ones of said selected samples are substantially constant.

24. The communication system as recited in claim 19 wherein ones of said selected samples is a fraction of corresponding ones of said samples.

25. The communication system as recited in claim 19 wherein ones of said samples and corresponding ones of said selected samples bear opposite signs.

* * * * *